US010805142B2

United States Patent
Petkov et al.

(10) Patent No.: US 10,805,142 B2
(45) Date of Patent: Oct. 13, 2020

(54) METHOD AND APPARATUS FOR BIDIRECTIONAL COMMUNICATION BETWEEN MEASURING DEVICES AND A DATA COLLECTOR

(71) Applicant: DIEHL METERING SYSTEMS GMBH, Nuremberg (DE)

(72) Inventors: Hristo Petkov, Nuremberg (DE); Thomas Lautenbacher, Erlangen (DE); Thomas Kauppert, Nuremberg (DE); Klaus Gottschalk, Winkelhaid (DE); Raphael Mzyk, Kammerstein (DE)

(73) Assignee: Diehl Metering Systems GmbH, Nuremberg (DE)

( * ) Notice: Subject to any disclaimer, the term of this patent is extended or adjusted under 35 U.S.C. 154(b) by 0 days.

(21) Appl. No.: 16/171,696

(22) Filed: Oct. 26, 2018

(65) Prior Publication Data

US 2019/0097864 A1    Mar. 28, 2019

Related U.S. Application Data

(63) Continuation of application No. PCT/EP2017/000414, filed on Apr. 4, 2017.

(30) Foreign Application Priority Data

Apr. 26, 2016  (DE) .......................... 10 2016 005 053
Jul. 27, 2016   (DE) .......................... 10 2016 009 197

(51) Int. Cl.
*H04L 27/36*   (2006.01)
*G08C 17/02*   (2006.01)
(Continued)

(52) U.S. Cl.
CPC ............. *H04L 27/36* (2013.01); *G01D 4/002* (2013.01); *G08C 17/02* (2013.01); *H04B 1/403* (2013.01);
(Continued)

(58) Field of Classification Search
CPC ................ H04L 2027/0018; H04L 2027/0022
See application file for complete search history.

(56) References Cited

U.S. PATENT DOCUMENTS

| 4,490,722 A | 12/1984 | Rounion et al. | |
| 5,438,329 A * | 8/1995 | Gastouniotis | .......... G01D 4/006 340/870.02 |

(Continued)

FOREIGN PATENT DOCUMENTS

| DE | 102004061742 B4 | 3/2009 |
| DE | 102010005587 A1 | 7/2011 |
| EP | 1653245 A2 | 5/2006 |
| GB | 691865 A | 5/1953 |

*Primary Examiner* — Kevin Kim
(74) *Attorney, Agent, or Firm* — Laurence A. Greenberg; Werner H. Stemer; Ralph E. Locher

(57) ABSTRACT

To optimally receive smart meter control messages transmitted by a concentrator, in a meter having a transceiver for bidirectional data interchange, despite its minimal resources, a current modulation reference frequency which is subject to drift is shifted by the instantaneous frequency difference between the current transmitter-side reference frequency and the current transceiver-side reference frequency in the concentrator. Therefore, the current reference frequencies correspond in the downlink without having to intervene in the meter. This frequency difference in the concentrator is obtained by comparing the current receiver-side demodulation reference frequency with the current transmitter-side reference frequency, and the current transceiver-side reference frequency, on the other hand, from messages from the transmitter of the concentrator and from the transceiver of the meter which are received using the receiver of the concentrator. A frequency-measuring comparator only needs to be connected upstream and downstream of the demodulator in the concentrator for this purpose.

9 Claims, 1 Drawing Sheet

(51) Int. Cl.
*G01D 4/00* (2006.01)
*H04Q 9/00* (2006.01)
*H04L 27/00* (2006.01)
*H04B 17/21* (2015.01)
*H04B 1/403* (2015.01)
*H04L 5/00* (2006.01)
*H04L 5/14* (2006.01)

(52) U.S. Cl.
CPC ........... *H04B 17/21* (2015.01); *H04L 5/0048* (2013.01); *H04L 27/0014* (2013.01); *H04Q 9/00* (2013.01); *H04L 5/143* (2013.01); *H04L 2027/0016* (2013.01); *H04L 2027/0065* (2013.01); *H04L 2027/0093* (2013.01); *H04Q 2209/10* (2013.01)

(56) References Cited

U.S. PATENT DOCUMENTS

| | | | |
|---|---|---|---|
| 5,801,643 A * | 9/1998 | Williams | G01D 4/004 340/870.02 |
| 6,771,720 B1 | 8/2004 | Yang et al. | |
| 7,065,409 B2 * | 6/2006 | Mazar | A61N 1/08 128/903 |
| 8,521,097 B1 * | 8/2013 | Wright | H03J 7/04 327/156 |
| 2007/0057812 A1 * | 3/2007 | Cornwall | H04Q 9/00 340/870.02 |
| 2010/0060479 A1 * | 3/2010 | Salter | G01D 4/002 340/870.4 |
| 2011/0140910 A1 * | 6/2011 | Olson | G01D 4/004 340/870.02 |

* cited by examiner

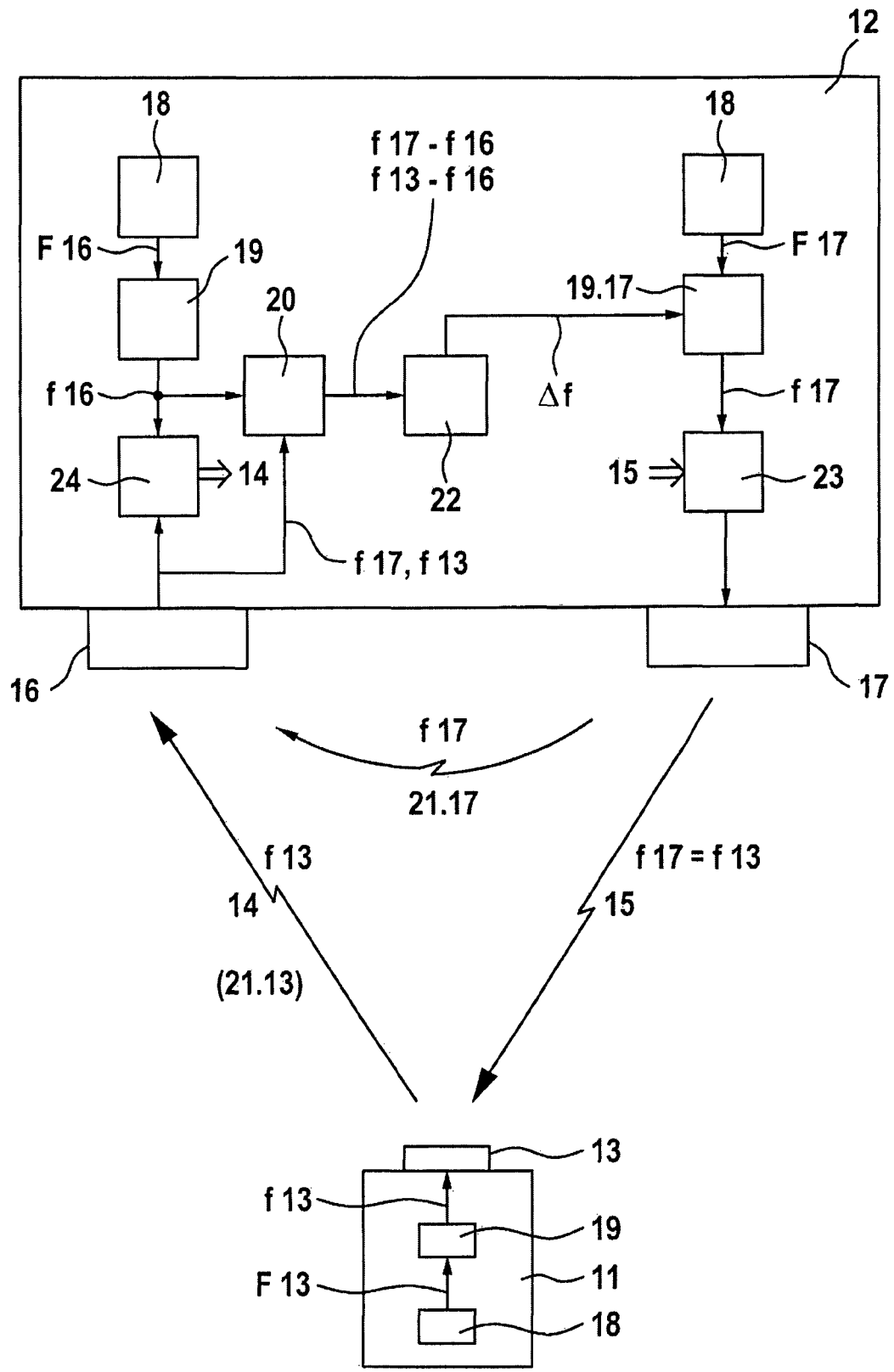

METHOD AND APPARATUS FOR BIDIRECTIONAL COMMUNICATION BETWEEN MEASURING DEVICES AND A DATA COLLECTOR

CROSS-REFERENCE TO RELATED APPLICATION

This is a continuation application, under 35 U.S.C. § 120, of copending international application No. PCT/EP2017/000414, filed Apr. 4, 2017, which designated the United States; this application also claims the priority, under 35 U.S.C. § 119, of German patent applications No. DE 10 2016 009 197.5, filed Jul. 27, 2016, and No. DE 10 2016 005 053.5, filed Apr. 26, 2016; the prior applications are herewith incorporated by reference in their entirety.

BACKGROUND OF THE INVENTION

Field of the Invention

Within the scope of the present description of the invention, a meter is quite generally understood as meaning a meter which cannot only transmit digitized measured values as individualized data messages to a data collector using short-range radio but can also receive control messages from the data collector by radio. Reference is made to the publications German patent DE 10 2004 061 742 B4 and published, non-prosecuted German patent application DE 10 2010 005 587 A1.

Each of the meters uses its sensors to capture, for instance, the consumption of cold and hot water, household gas or heat quantities in radiators and, in particular, electrical power at predefined intervals of time, possibly with subsequent analog/digital conversion of sensor values. A sequence of device-individual data messages is created with the addition of a time stamp and a meter identification. These data messages are transmitted from the respective meter to the receiver of the data collector which is jointly assigned to a plurality of meters, is installed at a remote location and is also referred to as a concentrator. The data messages from as many meters as possible are buffered and possibly preprocessed in the data collector before they are read and in the process are transmitted to a central office directly or by means of a mobile memory for evaluation, for instance for creating and sending annual consumption bills.

The meters and the data collector are equipped for bidirectional radio traffic between one another using short-range frequency bands which are available without a license. Therefore, control messages can also be transmitted from the transmitter of the data collector to individual meters, in particular to those meters for capturing electrical power consumption. The control messages are used, in particular, to optimize consumption costs, on the one hand, and to stabilize the network, on the other hand, by temporarily switching on electromotive or electrothermic large domestic appliances via the data collector in the form of a smart meter, for instance during currently low load demand from the supply network, especially under discounted tariff conditions during certain nighttime hours. The circuitry design of the receiver and of the transmitter in the data collector and their equipment with comparatively large tuned antennas are uncritical since sufficient space and also electrical operating energy from batteries or even a network connection are regularly available in the housing of the data collector.

However, the meter in the consumption device should be as inconspicuous as possible, that is to say compact. Since a network connection is regularly not available for its operation, each meter must operate autonomously by means of batteries, from which an operating period of typically more than ten years is expected. Therefore, the meter communication must be conducted here with comparatively little outlay on radio transmitting and receiving devices and circuitry owing to a lack of resources. This hampers, in particular, the interference-free narrowband downlink transmission of decodable control messages from the data collector to individual meters.

SUMMARY OF THE INVENTION

With knowledge of such circumstances, the present invention is based on the technical problem of receiving the control messages from the data collector in the meters, in particular in a form which can still be demodulated without any problems, even under such detrimental boundary conditions.

The object is achieved, according to the invention, by means of the respective combination of the essential features stated in the two independent claims. Accordingly, for the bidirectional radio traffic in the data collector, its receiver and its transmitter are each equipped with an oscillator, whereas only a common oscillator is provided for the transceiver in each meter for reasons of costs.

The center frequency or reference frequency to be subjected to amplitude, phase or frequency modulation, in particular binary modulation, before emission is derived from such a conventionally crystal-stabilized oscillator frequency. This reference frequency is likewise generated on the receiver side for the purpose of demodulating the modulated messages. However, crystal-stabilized oscillator frequencies are not constant in the long-term either and drift, in particular on the basis of the operating period and the operating temperature of the respective crystal and also on account of other influences on the circuit. However, an optimum reception is established only if the transmitter and the receiver operate with a corresponding reference frequency; the same effect is achieved if the reference frequency of the transmitter is recognized in the receiver. If there is an excessive difference, the modulated reception frequencies are so strongly eccentric, or are even outside the passband curve of receiving filters, that messages can finally no longer be demodulated.

In the case of the broadband uplink radio connections from the respective meter to the common data collector, such a frequency drift is uncritical in practice insofar as, as already mentioned, considerable resources are available for reception in the data collector, that is to say almost any desired outlay on antenna and filter design can be expended in order to be able to reconstruct data messages which can still be demodulated despite a reference frequency which has drifted.

The resources which, in contrast, are very limited, as mentioned, in the respective meter are critical for receiving control messages via its transceiver. In the case of a center frequency offset between the data collector transmitter and the meter receiver, the latter is quickly no longer able to demodulate usable control messages for the current smart meter function, that is to say for configuring the so-called smart meter for influencing consumption.

As a remedy for this, frequency difference measurements are carried out according to the invention in the data collector and, according to the results of the measurements, its transmission reference frequency derived from the crystal oscillator circuit is detuned until there is currently sufficient center frequency correspondence for the narrowband downlink connection from the data collector to the corresponding meter.

This solution according to the invention and its implementation in terms of apparatus are explained in more detail below on the basis of the basic sketch of a preferred implementation example, which has been simplified to the elements essential to the function in the form of a block diagram, according to the single FIGURE of the drawing. Developments of the solution according to the invention also emerge therefrom and from the dependent claims.

Other features which are considered as characteristic for the invention are set forth in the appended claims.

Although the invention is illustrated and described herein as embodied in a method and an apparatus for bidirectional communication between measuring devices and a data collector, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a block diagram of a metering system according to the invention.

DETAILED DESCRIPTION OF THE INVENTION

Referring now to the single FIGURE of the drawing in detail, there is shown one of numerous meters or measuring devices 11 (only one of which is illustrated here) also referred to as smart meters communicates in a bidirectional manner with—at least—one data collector 12 which is common to the meters and is also referred to as a concentrator. Each of the meters 11 is equipped with a transceiver 13 for the broadband transmission of data messages 14 (uplink) and the narrowband reception of control messages 15 (downlink). In contrast, the data collector 12 has one or more receivers 16 and one or more transmitters 17. The transceiver 13, the receiver 16 and the transmitter 17 each contain an oscillator 18, in particular a crystal oscillator. The center or carrier frequency, referred to here as the reference frequency f, to be used on the transmission side is derived for a modulator 23 from the respective oscillator frequencies F of the crystal oscillator by frequency division or multiplication operations in conditioners 19. Within the scope of the present invention, the modulator 23 may likewise be configured for frequency, phase or amplitude modulation, for instance. In addition, the modulation need not necessarily be binary (for example 2FSK) and others, such as 4FSK, can also be advantageously used. The accordingly configured demodulator 24 on the reception side operates at the same reference frequency f mentioned with filters (not illustrated) tuned thereto.

However, as a result of ageing and temperature influences, in particular on the oscillators 18, the respectively predefined oscillator frequencies F13, F16 and F17 drift, and so the carrier or reference frequencies f13, f16 and f17 derived therefrom in situ then no longer correspond. In the extreme case, if it is not possible to discern on the reception side which reference frequency f (f13 or f17) was modulated on the transmitter side, demodulation on the reception side is no longer possible at all. In contrast, the transmission conditions which are optimum in this respect are present if the reference frequencies f are identical on the transmission and reception sides.

In order to achieve demodulation conditions which are as good as possible for control messages 15 received in the meter with the smallest possible amount of outlay on circuitry despite the drifting of the reference frequencies fin each meter 11, the receiver 16 of the data collector 12 is equipped with at least one comparator 20 for a reference frequency f13 currently received from the meter 11 and for its own current actual reference frequency f16. What is serially explained here in the form of a block diagram for simplifying the explanation is a frequency meter which is usually implemented using software in circuitry practice and determines the frequency values sought and the frequency differences at the same time or in succession and stores or outputs them.

The frequency comparator 20 is virtually connected in parallel with the demodulator 24 by being connected, as sketched, to the input for the receiver-side reference frequency f16, on the one hand, and to the input for received reference frequencies f13 and f17, on the other hand. A calibration message 21.17 is specifically transmitted from the transmitter 17 to the receiver 16 in the data collector 12 in order to determine the received instantaneous transmission-side reference frequency f17 as such with regard to the reference frequency f16 currently generated on the reception side, namely the frequency difference f17−f16, by means of the comparator 20 on the reception side. In addition, the receiver 16 of the data collector 12 receives a data message 14 currently arriving from the transceiver 13, or a calibration message 21.13 triggered as a substitute, at its current reference frequency f13; and the frequency difference f13−f16 is determined therefrom in the comparator 20. These two frequency differences are in turn switched to a subtractor 22 which provides their difference (f17−f16)−(f13−f16) as the frequency difference f17−f13=Δf, in which the receiver reference frequency f16 is consequently no longer included. The reference frequency f17 formed a priori for the downlink is shifted by this differential frequency Δf which is fed into the conditioner 19.17 of the transmitter 17, for example, with the result that the reference frequencies f17−f13 for the modulator 23 in the transmitter 17 and for the reception-side demodulator in the transceiver 13 now correspond.

As stated above, optimum conditions for demodulating the control message 15 received on the downlink from the meter 11 result from this correspondence of the modulation and demodulation reference frequency f without the meter 11 with its transceiver 13 having to be burdened for this purpose with additional outlay on circuitry for determining and possibly correcting the instantaneous transceiver-side reference frequency f13. Rather, the downlink frequency correction is carried out in the data collector 11 and this is carried out by means of a real (calibration) message 21 which is interchanged between the transmitter 17 and the receiver 16 and therefore concomitantly captures all radio conditions, rather than on the basis of an internal frequency measurement.

In order to therefore optimally receive the smart meter control messages 15 transmitted by a concentrator, a data collector 12, to a meter 11 having a transceiver 13 for bidirectional, for example binary-frequency-modulated, data interchange despite its minimal resources, the current modulation reference frequency f17 which is subject to drift is shifted according to the invention by the instantaneous frequency difference Δf between the current transmitter-side reference frequency f17 and the current transceiver-side reference frequency f13 in the data collector 12. As a result, the current reference frequencies f17=f13 correspond during downlink reception without having to have intervened in the meter 11 for this purpose. This frequency difference Δf in the data collector 12 is obtained by comparing the current receiver-side demodulation reference frequency f16 with the current transmitter-side reference frequency f17, on the one hand, and the current transceiver-side reference frequency f13, on the other hand, from messages 14, 21 from the transmitter 17 of the data collector 12 and from the transceiver 13 of the meter 11 which are received using the receiver 16 of the data collector 12. Without using the resources of the meter 11, a frequency-measuring comparator 20 only needs to be connected upstream and downstream of the demodulator 24 in the data collector 12, followed by a differential frequency subtractor 22 connected to the transmitter-side conditioner 19.17 for deriving the reference frequency f from a crystal-stabilized oscillator frequency F, for this transmission/reception frequency comparison.

The following is a summary list of reference numerals and the corresponding structure used in the above description of the invention:
11 Meter
12 Data collector
13 Transceiver
14 Data message
15 (Control) message
16 Receiver
17 Transmitter
18 Oscillator; F=oscillator frequency
19 Conditioner; f=reference frequency; Δf=frequency difference f17−f13
20 Comparator
21 Calibration message
22 Subtractor
23 Modulator
24 Demodulator

The invention claimed is:

1. A method for bidirectional communication between a data collector having a transmitter and a receiver, on the one hand, and measuring devices having transceivers, on the other hand, by means of a reference frequency, the transceivers, the receiver and the transmitter each having an oscillator with oscillator frequencies being subject to drift and from which the reference frequency to be modulated or demodulated is derived, which comprises the step of:
    shifting a current transmitter-side reference frequency by an instantaneous frequency difference between the current transmitter-side reference frequency and a current transceiver-side reference frequency derived from at least one data message from the data collector in order to continuously compensate for drifting of the reference frequencies and to transmit messages in a narrowband downlink connection from the data collector to one of the measuring devices being a meter.

2. The method according to claim 1, which further comprises comparing a receiver-side reference frequency with both the current transmitter-side reference frequency and with the current transceiver-side reference frequency in the data collector and the instantaneous frequency difference is formed from derived differences.

3. The method according to claim 1, which further comprises:
    measuring the current transmitter-side reference frequency in a calibration message emitted by the transmitter of the data collector in the receiver of the data collector; and
    measuring the current transceiver-side reference frequency in a data message emitted by the meter in the receiver of the data collector.

4. The method according to claim 1, which further comprises measuring the current transmitter-side reference frequency in a calibration message emitted by the transmitter of the data collector and the current transceiver-side reference frequency in a calibration message emitted by the meter in the receiver of the data collector.

5. A system for bidirectional communication, the system comprising:
    at least one measuring device having a transceiver;
    a data collector having a transmitter and a receiver for a bidirectional interchange of modulated messages with said at least one measuring device;
    said transceiver, said transmitter and said receiver each having an oscillator for deriving reference frequencies which are subject to drift;
    said data collector further containing:
        at least one comparator to which a current receiver-side reference frequency f16, a currently received transmitter-side reference frequency f17, and a currently received transceiver-side reference frequency f13 are applied; and
        a subtractor, connected downstream of said comparator, and determining a frequency difference Δf=f17−f13 between two frequency differences (f17−f16) and (f13−f16), which shifts the transmitter-side reference frequency f17 by the frequency difference Δf onto the transceiver-side reference frequency f13.

6. The device according to claim 5, wherein:
    said data collector further has conditioners, including a transmitter-side conditioner, for deriving the reference frequencies from oscillator frequencies; and
    said subtractor is connected to said transmitter-side conditioner.

7. The device according to claim 5, wherein:
    said data collector further has a demodulator with inputs; and
    said comparator is a frequency-measuring comparator connected to said inputs of said demodulator for demodulation of the receiver-side reference frequency f16 or of the transceiver-side reference frequency f13.

8. The device according to claim 5, wherein said oscillators are crystal-stabilized.

9. A system for bidirectional communication, the system comprising:
    at least one measuring device having a transceiver and an oscillator outputting a transceiver-side reference frequency being subject to drift;
    a data collector having a transmitter and a receiver for a bidirectional interchange of modulated messages with said at least one measuring device, said transmitter having an oscillator outputting a transmitter-side reference frequency being subject to drift, said receiver having an oscillator outputting a receiver-side reference frequency being subject to drift;
    said data collector programmed to:
        shift the transmitter-side reference frequency by an instantaneous frequency difference between the transmitter-side reference frequency and the transceiver-side reference frequency derived from at least one data message from said data collector in order to continuously compensate for drifting of the reference frequencies; and transmit messages in a narrowband downlink connection from said data collector to said measuring device being a meter.

\* \* \* \* \*